US009831802B1

(12) United States Patent
Hu et al.

(10) Patent No.: US 9,831,802 B1
(45) Date of Patent: Nov. 28, 2017

(54) DRIVING APPARATUS FOR DRIVING A MULTI-PHASE LOAD, A CONTROLLER THEREOF AND A CONTROL METHOD THEREOF

(71) Applicant: NATIONAL CHIAO TUNG UNIVERSITY, Hsinchu (TW)

(72) Inventors: Jwu-Sheng Hu, Zhubei (TW); Keng-Yuan Chen, Hsinchu (TW)

(73) Assignee: NATIONAL CHIAO TUNG UNIVERSITY (TW)

( * ) Notice: Subject to any disclaimer, the term of this patent is extended or adjusted under 35 U.S.C. 154(b) by 0 days.

(21) Appl. No.: 15/472,752

(22) Filed: Mar. 29, 2017

(30) Foreign Application Priority Data

Jun. 24, 2016 (TW) .............................. 105119854 A

(51) Int. Cl.
  *H02M 7/5395* (2006.01)
  *H02M 1/12* (2006.01)
  *H02M 1/08* (2006.01)
  *H02P 27/04* (2016.01)

(52) U.S. Cl.
  CPC ........... *H02M 7/5395* (2013.01); *H02M 1/08* (2013.01); *H02M 1/12* (2013.01); *H02P 27/04* (2013.01)

(58) Field of Classification Search
  CPC ........ H02M 7/5395; H02M 1/08; H02M 1/12; H02P 27/04
  See application file for complete search history.

(56) References Cited

U.S. PATENT DOCUMENTS

| 7,046,527 | B2 | 5/2006 | West |
| 7,791,386 | B2 | 9/2010 | Kris |
| 2007/0194734 | A1* | 8/2007 | Weinmann ............... H02P 27/06 318/400.31 |
| 2007/0216341 | A1 | 9/2007 | Gataric et al. |
| 2012/0161685 | A1* | 6/2012 | Geyer ..................... H02M 1/12 318/503 |

(Continued)

OTHER PUBLICATIONS

G. Narayanan, Di Zhao, Harish K. Krishnamurthy, Rajapandian Ayyanar and V. T. Ranganathan, "Space Vector Based Hybrid PWM Techniques for Reduced Current Ripple," IEEE Transactions on Industrial Electronics, vol. 55, No. 4, Apr. 2008, pp. 1614-1627.

(Continued)

*Primary Examiner* — Jue Zhang
*Assistant Examiner* — Jye-June Lee
(74) *Attorney, Agent, or Firm* — Brooks Kushman P.C.

(57) ABSTRACT

A driving apparatus includes an inverter and a controller. The inverter converts, based on pulse width modulation (PWM) signals, an input voltage into output voltage signals that are used to drive a multi-phase load. The controller includes: a sequence generating module generating a first switching sequence and at least one second switching sequence based on duty cycle values; a selecting module selecting, to serve as a selected switching sequence, one of the first and second switching sequences that is determined to make phase currents which flow through the multi-phase load due to the output voltage signals have lowest total harmonic distortion; and an output generating module generates the PWM signals based on the selected switching sequence.

19 Claims, 12 Drawing Sheets

(56) References Cited

U.S. PATENT DOCUMENTS

2014/0009988 A1 1/2014 Valiani
2017/0063247 A1* 3/2017 Kieferndorf ............ H02M 5/04

OTHER PUBLICATIONS

Di Zhao, Hari, V. S. S. Pavan Kumar Hari, Gopalaratnam Narayanan and Rajapandian Ayyanar, "Space-Vector-Based Hybrid Pulsewidth Modulation Techniques for Reduced Harmonic Distortion and Switching Loss," IEEE Transactions on Power Electronics, vol. 25, No. 3, Mar. 2010, pp. 760-774.

Ahmet M. Hava and Emre Ün, "Performance Analysis of Reduced Common-Mode Voltage PWM Methods and Comparison with Standard PWM Methods for Three-Phase Voltage-Source Inverters," IEEE Transactions on Power Electronics, vol. 24, No. 1, Jan. 2009, pp. 241-252.

Drazen Dujic, Martin Jones, Emil Levi, Joel Prieto and Federico Barrero, "Switching Ripple Characteristics of Space Vector PWM Schemes for Five-Phase Two-Level Voltage Source Inverters—Part 1: Flux Harmonic Distortion Factors," IEEE Transactions on Industrial Electronics, vol. 58, No. 7, Jul. 2011, pp. 2789-2798.

Martin Jones, Drazen Dujic, Emil Levi, Joel Prieto and Federico Barrero, "Switching Ripple Characteristics of Space Vector PWM Schemes for Five-Phase Two-Level Voltage Source Inverters—Part 2: Current Ripple," IEEE Transactions on Industrial Electronics, vol. 58, No. 7, Jul. 2011, pp. 2799-2808.

Joel Prieto, Martin Jones, Federico Barrero, Emil Levi and Sergio Toral , "Comparative Analysis of Discontinuous and Continuous PWM Techniques in VSI-Fed Five-Phase Induction Motor," IEEE Transactions on Industrial Electronics, vol. 58, No. 12, Dec. 2011, pp. 5324,5335.

* cited by examiner

DRIVING APPARATUS FOR DRIVING A MULTI-PHASE LOAD, A CONTROLLER THEREOF AND A CONTROL METHOD THEREOF

CROSS-REFERENCE TO RELATED APPLICATION

This application claims priority of Taiwanese Patent Application No. 105119854, filed on Jun. 24, 2016.

TECHNICAL FIELD

The disclosure relates to driving techniques, and more particularly to a driving apparatus for driving a multi-phase load, to a controller thereof, and to a control method thereof.

BACKGROUND

A conventional driving apparatus uses space vector pulse width modulation (SVPWM) techniques to generate ten PWM signals with a PWM period that has a duration corresponding to a carrier frequency. The conventional driving apparatus controls, based on each PWM signal, operation of a respective one of ten switches thereof between conduction and non-conduction, so as to convert a direct current (DC) input voltage into five output voltage signals for driving a five-phase motor, thereby generating five alternating current (AC) phase currents that flow through the five-phase motor. The phase currents have the same fundamental frequency that is lower than the carrier frequency, and an $m^{th}$ one thereof lags a first one thereof by $[72 \times (m-1)]°$ in phase, where $2 \leq m \leq 5$.

In order to reduce the total harmonic distortion of the phase currents, the carrier frequency must be increased (i.e., the duration of the PWM period must be decreased). However, a higher carrier frequency leads to more switchings and thus more switching loss for each switch, and to lower conversion efficiency of the conventional driving apparatus.

SUMMARY

Therefore, an object of the disclosure is to provide a driving apparatus that can alleviate the drawback of the prior art, a controller thereof and a control method thereof.

According to one aspect of the disclosure, the driving apparatus is used to drive a multi-phase load, and includes an inverter and a controller. The inverter is used to receive an input voltage, and receives a plurality of pulse width modulation (PWM) signals. The inverter converts, based on the PWM signals, the input voltage into a plurality of output voltage signals that are used to drive the multi-phase load. The controller includes a sequence generating module, a selecting module and an output generating module. The sequence generating module receives a plurality of duty cycle values, and generates a first switching sequence and at least one second switching sequence based on the duty cycle values. The selecting module is coupled to the sequence generating module for receiving the first and second switching sequences therefrom. The selecting module selects, to serve as a selected switching sequence, one of the first and second switching sequences that is determined to make a plurality of phase currents which flow through the multi-phase load due to the output voltage signals have lowest total harmonic distortion. The output generating module is coupled to the selecting module for receiving the selected switching sequence therefrom, and is coupled further to the inverter. The output generating module generates the PWM signals for the inverter based on the selected switching sequence. Each of the PWM signals is transitionable between a first state and a second state. The first switching sequence corresponds to that each of the PWM signals transitions two times during a PWM period of the PWM signals. Each of the at least one second switching sequence corresponds to that each of at least two of the PWM signals does not transition during the PWM period, and that each of remaining ones of the PWM signals transitions at least two times during the PWM period. A total number of the transitions occurring in the PWM signals during the PWM period when any one of the at least one second switching sequence is selected equals a total number of the transitions occurring in the PWM signals during the PWM period when the first switching sequence is selected.

According to another aspect of the disclosure, the controller is used to control an inverter to convert an input voltage into a plurality of output voltage signals for driving a multi-phase load. The controller includes a sequence generating module, a selecting module and an output generating module. The sequence generating module receives a plurality of duty cycle values, and generates a first switching sequence and at least one second switching sequence based on the duty cycle values. The selecting module is coupled to the sequence generating module for receiving the first and second switching sequences therefrom. The selecting module selects, to serve as a selected switching sequence, one of the first and second switching sequences that is determined to make a plurality of phase currents which flow through the multi-phase load due to the output voltage signals have lowest total harmonic distortion. The output generating module is coupled to the selecting module for receiving the selected switching sequence therefrom. The output generating module generates, based on the selected switching sequence, a plurality of pulse width modulation (PWM) signals which are used to control the inverter, and each of which is transitionable between a first state and a second state. The first switching sequence corresponds to that each of the PWM signals transitions two times during a PWM period of the PWM signals. Each of the at least one second switching sequence corresponds to that each of at least two of the PWM signals does not transition during the PWM period, and that each of remaining ones of the PWM signals transitions at least two times during the PWM period. A total number of the transitions occurring in the PWM signals during the PWM period when any one of the at least one second switching sequence is selected equals a total number of the transitions occurring in the PWM signals during the PWM period when the first switching sequence is selected.

According to yet another aspect of the disclosure, there is provided the control method for controlling, using a controller, an inverter to convert an input voltage into a plurality of output voltage signals for driving a multi-phase load. The control method includes the steps of: generating, by the controller, a first switching sequence and at least one second switching sequence based on a plurality of duty cycle values; selecting to serve as a selected switching sequence, by the controller, one of the first and second switching sequences that is determined to make a plurality of phase currents which flow through the multi-phase load due to the output voltage signals have lowest total harmonic distortion; and generating based on the selected switching sequence, by the controller, a plurality of pulse width modulation (PWM) signals which are used to control the inverter, and each of which is transitionable between a first state and a second state. The first switching sequence corresponds to that each of the PWM signals transitions two times during a PWM period of the PWM signals. Each of the at least one second switching sequence corresponds to that each of at least two of the PWM signals does not transition during the PWM period, and that each of remaining ones of the PWM signals transitions at least two times during the PWM period. A total number of the transitions occurring in the PWM signals during the PWM period when any one of the at least one second switching sequence is selected equals a total number of the transitions occurring in the PWM signals during the PWM period when the first switching sequence is selected.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
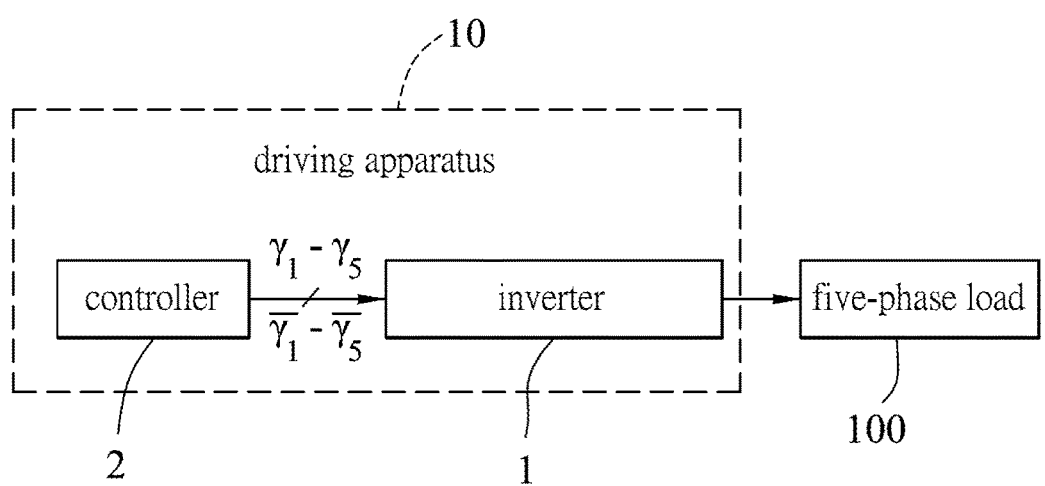
FIG. 1 is a block diagram illustrating an embodiment of a driving apparatus according to the disclosure in use with a five-phase load.

Referring to FIG. 1, an embodiment of a driving apparatus 10 according to the disclosure is used to drive an M-phase load 100 (e.g., an M-phase motor in a wye or delta configuration). For illustration purposes, M=5 in this embodiment. The driving apparatus 10 of this embodiment includes an inverter 1 and a controller 2.

Figure 2:
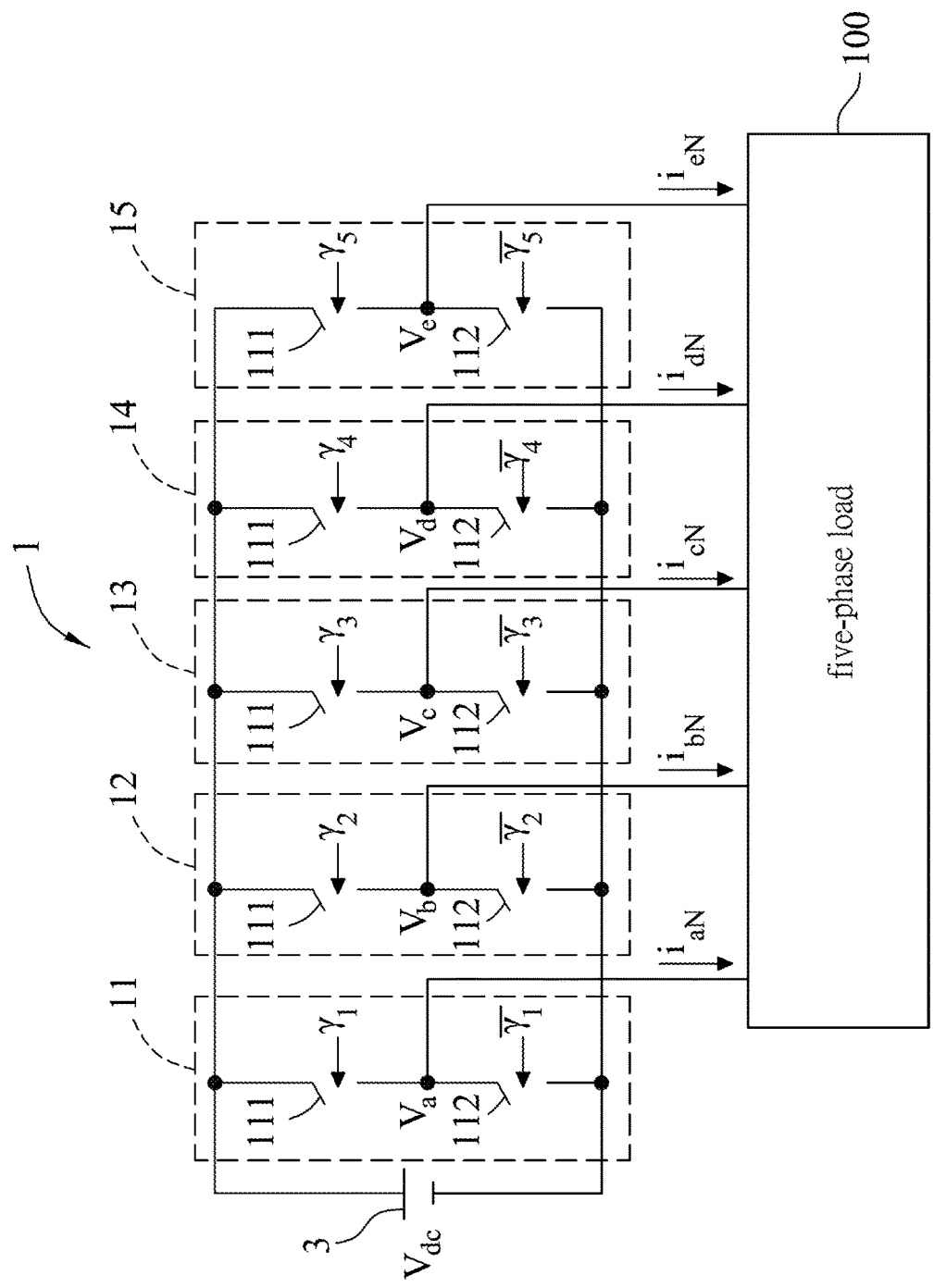
FIG. 2 is a circuit block diagram illustrating an inverter of the embodiment.

Referring to FIG. 2, the inverter 1 is used to be coupled to a direct current (DC) power source 3 and the five-phase load 100. The inverter 1 receives a DC input voltage ($V_{dc}$) from the DC power source 3, and further receives a number (2×M) (ten in this embodiment) of pulse width modulation (PWM) signals ($\gamma_1$-$\gamma_5$, $\overline{\gamma_1}$-$\overline{\gamma_5}$). The inverter 1 converts, based on the PWM signals ($\gamma_1$-$\gamma_5$, $\overline{\gamma_1}$-$\overline{\gamma_5}$), the input voltage ($V_{dc}$) into a number (M) (five in this embodiment) of output voltage signals ($V_a$-$V_e$) that are used to drive the five-phase load 100, thereby generating a number (M) (five in this embodiment) of phase currents ($i_{aN}$-$i_{eN}$) that flow through the five-phase load 100.

In this embodiment, the inverter 1 includes a number M (five in this embodiment) of legs 11-15. Each leg 11-15 includes a first switch 111 and a second switch 112 that are coupled to each other. The first switches 111 of the legs 11-15 are used to be coupled further to a positive terminal of the DC power source 3. The second switches 112 of the legs 11-15 are used to be coupled further to a negative terminal of the DC power source 3. The first and second switches 111, 112 of the legs 11-15 respectively receive the PWM signals ($\gamma_1$-$\gamma_5$, $\overline{\gamma_1}$-$\overline{\gamma_5}$), and are each operable between conduction and non-conduction based on the respective PWM signal ($\gamma_1$-$\gamma_5$, $\overline{\gamma_1}$-$\overline{\gamma_5}$). Each output voltage signal ($V_a$-$V_e$) is provided at a common node between the first and second switches 111, 112 of a respective leg 11-15.

In this embodiment, each PWM signal ($\gamma_1$-$\gamma_5$, $\overline{\gamma_1}$-$\overline{\gamma_5}$) is transitionable between a first state (e.g., a logic high level) that corresponds to the conduction of the respective switch 111, 112, and a second state (e.g., a logic low level) that corresponds to the non-conduction of the respective switch 111, 112. For each leg 11-15, the two corresponding PWM signals ($\gamma_1$-$\gamma_5$, $\overline{\gamma_1}$-$\overline{\gamma_5}$) are complementary to each other, such that: (a) when one of the first and second switches 111, 112 conducts, the other one of the first and second switches 111, 112 does not conduct; (b) when the first switch 111 conducts and the second switch 112 does not conduct, the respective output voltage signal ($V_a$-$V_e$) equals the input voltage ($V_{dc}$); and (c) when the first switch 111 does not conduct and the second switch 112 conducts, the respective output voltage signal ($V_a$-$V_e$) is zero. In other words, each output voltage signal ($V_a$-$V_e$) is transitionable between the input voltage ($V_{dc}$) and zero.

Figure 3:
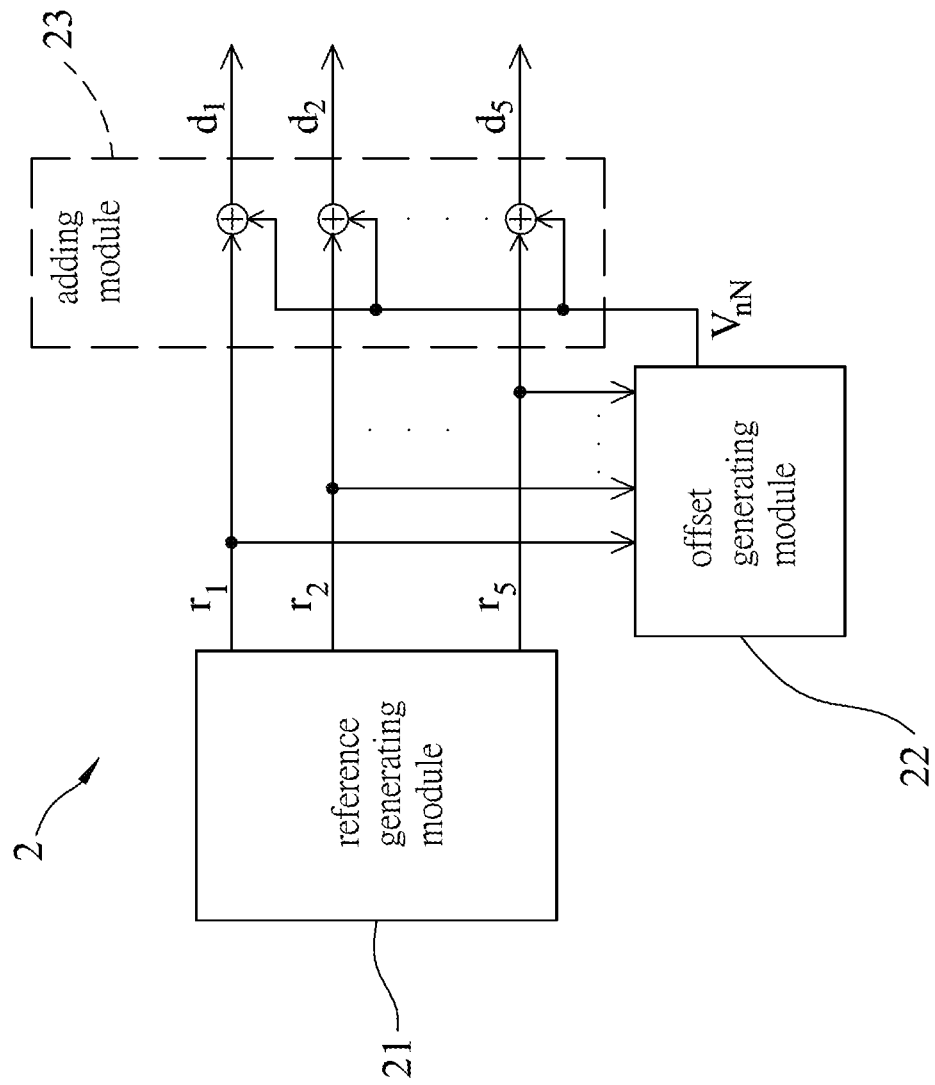
FIGS. 3 and 4 are block diagrams cooperatively illustrating a controller of the embodiment.
Figure 4:
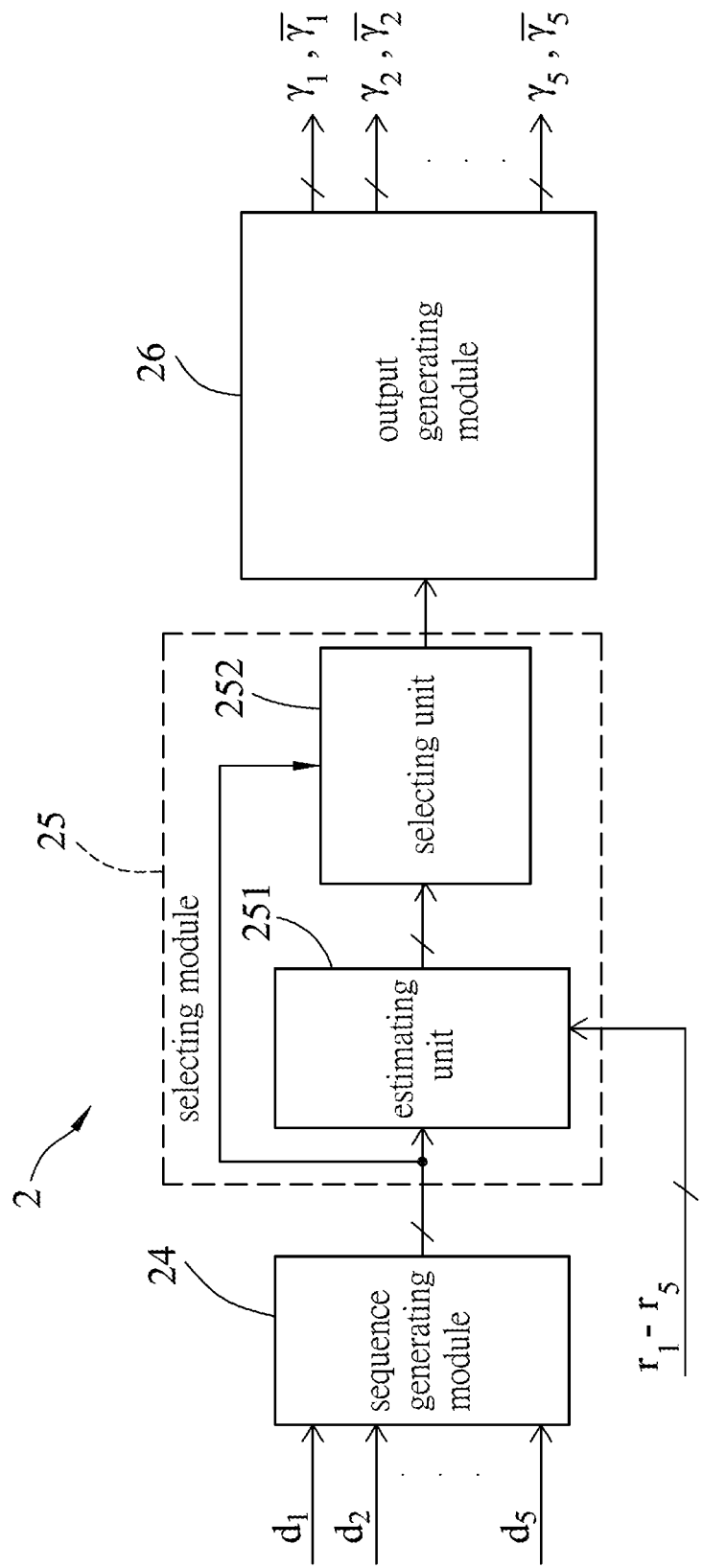

Referring to FIGS. 3 and 4, the controller 2 includes a reference generating module 21, an offset generating module 22, an adding module 23, a sequence generating module 24, a selecting module 25 and an output generating module 26.

Referring to FIG. 3, the reference generating module 21 generates a number (M) (five in this embodiment) of reference values ($r_1$-$r_5$) that respectively correspond to a number (M) (five in this embodiment) of predetermined reference phase voltage curves. The predetermined reference phase voltage curves have the same fundamental frequency of $f_0$ and the same peak amplitude, and an $m^{th}$ one thereof lags a first one thereof by [(360/M)×(m−1)]°([72×(m−1)]° in this embodiment) in phase, where 2≤m≤M (2≤m≤5 in this embodiment). Each reference value ($r_1$-$r_5$) changes over time, and sequentially equals samples of the respective predetermined reference phase voltage curve that are normalized to the input voltage ($V_{dc}$), and that are taken at a carrier frequency of $f_c$ which is higher than the fundamental frequency of $f_0$ (i.e., $f_c$>$f_0$). The peak amplitude of the predetermined reference phase voltage curves is sufficient to make a difference between a maximum one and a minimum one of the reference values ($r_1$-$r_5$) less than one (i.e., max(r)−min(r)<1, where max(r) and min(r) respectively denote the maximum and minimum reference values).

The offset generating module 22 is coupled to the reference generating module 21 for receiving the reference values ($r_1$-$r_5$) therefrom, and generates an offset value ($V_{nN}$) based on the reference values ($r_1$-$r_5$), where −min(r)<$V_{nN}$<1−max(r). In this embodiment, $V_{nN}$=0.5−0.5×[min(r)+max(r)].

The adding module 23 is coupled to the reference generating module 21 for receiving the reference values ($r_1$-$r_5$) therefrom, and is coupled further to the offset generating module 22 for receiving the offset value ($V_{nN}$) therefrom. The adding module 23 adds up each reference value ($r_1$-$r_5$) and the offset value ($V_{nN}$) to generate a respective duty cycle value ($d_1$-$d_5$) (i.e., $d_m = r_m + V_{nN}$, where $1 \leq m \leq 5$). The offset value ($V_{nN}$) makes each duty cycle value ($d_1$-$d_5$) greater than zero and less than one (i.e., $0 < d_m < 1$, where $1 \leq m \leq 5$).

Referring to FIGS. 2 to 4, the sequence generating module 24 is coupled to the adding module 23 for receiving the duty cycle values ($d_1$-$d_5$) therefrom, and generates a first switching sequence and at least one second switching sequence based on the duty cycle values ($d_1$-$d_5$).

The selecting module 25 is coupled to the sequence generating module 24 for receiving the first and second switching sequences therefrom, and is coupled further to the reference generating module 21 for receiving the reference values ($r_1$-$r_5$) therefrom. Based on the first and second switching sequences and the reference values ($r_1$-$r_5$), the selecting module 25 selects, to serve as a selected switching sequence, one of the first and second switching sequences that is determined to make the phase currents ($i_{aN}$-$i_{eN}$) have lowest total harmonic distortion.

The output generating module 26 is coupled to the selecting module 25 for receiving the selected switching sequence therefrom, and is coupled further to the first and second switches 111, 112 of the legs 11-15. The output generating module 26 generates the PWM signals ($\gamma_1$-$\gamma_5$, $\overline{\gamma_1}$-$\overline{\gamma_5}$) respectively for the first and second switches 111, 112 of the legs 11-15 based on the selected switching sequence.

Figure 5:
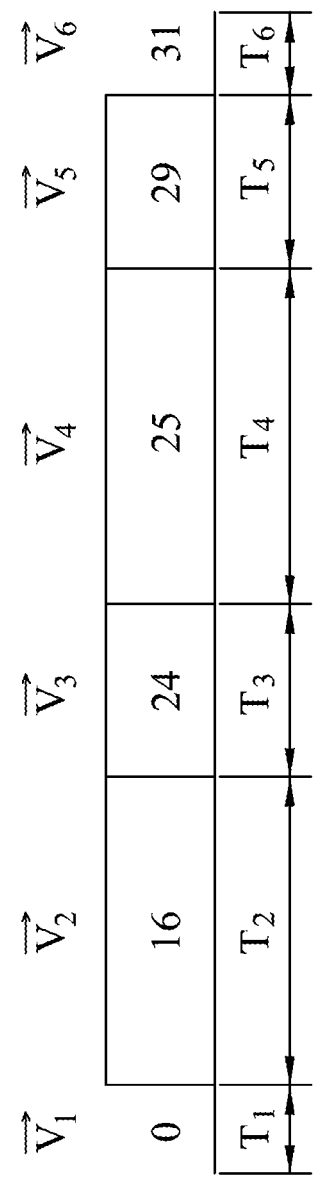
FIG. 5 is a plot illustrating an exemplary first switching sequence of the embodiment.

Referring to FIGS. 5 to 9, in this embodiment, four second switching sequences are generated, and each of the first and second switching sequences corresponds to a respective PWM signal combination, which is a candidate for the combination of the PWM signals ($\gamma_1$-$\gamma_5$, $\overline{\gamma_1}$-$\overline{\gamma_5}$) to be outputted by the output generating module 26. As shown in FIG. 5, the first switching sequence includes a number (M+1) (six in this embodiment) of vectors ($\vec{V_1}$-$\vec{V_6}$) which are arranged sequentially, and each of which has a respective duration. As shown in FIGS. 6 to 9, each second switching sequence includes a number (M+1) (six in this embodiment) of vectors ($\vec{V_1'}$-$\vec{V_6'}$) which are arranged sequentially, and each of which has a respective duration.

Referring to FIGS. 2 and 5 to 9, in this embodiment, each vector ($\vec{V_1}$-$\vec{V_6}$, $\vec{V_1'}$-$\vec{V_6'}$) includes a number (M) (five in this embodiment) of bits ($b_1$-$b_5$) (i.e., $\vec{V_m}$ or $\vec{V_m'} = [b_1\ b_2\ b_3\ b_4\ b_5]$, where $1 \leq m \leq 6$). In order to facilitate description of this embodiment, $[b_1\ b_2\ b_3\ b_4\ b_5]$ is alternatively expressed as a value of $b_1 \times 2^4 + b_2 \times 2^3 + b_3 \times 2^2 + b_4 \times 2^1 + b_5 \times 2^0$ hereinafter. For each of the first and second switching sequences, the bits ($b_1$-$b_5$) respectively represent the states of the PWM signals ($\gamma_1$-$\gamma_5$) in the respective PWM signal combination, and respectively represent the states of the PWM signals ($\overline{\gamma_1}$-$\overline{\gamma_5}$) in the respective PWM signal combination. Each bit ($b_1$-$b_5$) of, for example, logic '1' represents that the corresponding PWM signal ($\gamma_1$-$\gamma_5$) is at the first state (i.e., the corresponding first switch 111 conducts), and that the corresponding PWM signal ($\overline{\gamma_1}$-$\overline{\gamma_5}$) is at the second state (i.e., the corresponding second switch 112 does not conduct). Each bit ($b_1$-$b_5$) of, for example, logic '0' represents that the corresponding PWM signal ($\gamma_1$-$\gamma_5$) is at the second state (i.e., the corresponding first switch 111 does not conduct), and that the corresponding PWM signal ($\overline{\gamma_1}$-$\overline{\gamma_5}$) is at the first state (i.e., the corresponding second switch 112 conducts).

Referring to FIGS. 2 to 5 and Table 1 below, in this embodiment, the predetermined reference phase voltage curves may result in a number (2×M) (ten in this embodiment) of different descending sequences of the duty cycle values ($d_1$-$d_5$) as shown in Table 1 below. For the first switching sequence, as shown in Table 1 below, a first one of the vectors ($\vec{V_1}$) is [0 0 0 0 0]=0, and an $(m+1)^{th}$ one of the vectors ($\vec{V_{m+1}}$) differs from an $m^{th}$ one of the vectors ($\vec{V_m}$) by one of the bits ($b_1$-$b_5$) that represents the state of one of the PWM signals ($\gamma_1$-$\gamma_5$) which has an $m^{th}$ largest one of the duty cycle values ($d_1$-$d_5$) in the corresponding PWM signal combination, where $1 \leq m \leq 5$. For example, under a circumstance where $d_1 > d_2 > d_5 > d_3 > d_4$, the second vector ($\vec{V_2}$) is [1 0 0 0 0]=16 (i.e., differs from the first vector ($\vec{V_1}$) by the bit ($b_1$) that corresponds to the PWM signal ($\gamma_1$) having the largest duty cycle value ($d_1$) in the corresponding PWM signal combination), the third vector ($\vec{V_3}$) is [1 1 0 0 0]=24 (i.e., differs from the second vector ($\vec{V_2}$) by the bit ($b_2$) that corresponds to the PWM signal ($\gamma_2$) having the second largest duty cycle value ($d_2$) in the corresponding PWM signal combination), the fourth vector ($\vec{V_4}$) is [1 1 0 0 1]=25 (i.e., differs from the third vector ($\vec{V_3}$) by the bit ($b_5$) that corresponds to the PWM signal ($\gamma_5$) having the third largest duty cycle value ($d_5$) in the corresponding PWM signal combination), the fifth vector ($\vec{V_5}$) is [1 1 1 0 1]=29 (i.e., differs from the fourth vector ($\vec{V_4}$) by the bit ($b_3$) that corresponds to the PWM signal ($\gamma_3$) having the fourth largest duty cycle value ($d_3$) in the corresponding PWM signal combination), and the sixth vector ($\vec{V_6}$) is [1 1 1 1 1]=31 (i.e., differs from the fifth vector ($\vec{V_5}$) by the bit ($b_4$) that corresponds to the PWM signal ($\gamma_4$) having the fifth largest duty cycle value ($d_4$) in the corresponding PWM signal combination).

TABLE 1

| arrangement | first switching sequence | second switching sequences |
|---|---|---|
| $d_1 > d_2 > d_5 > d_3 > d_4$ | {0, 16, 24, 25, 29, 31} | {16, 0, 16, 24, 25, 29} |
| | | {24, 16, 24, 25, 29, 31} |
| | | {0, 16, 24, 25, 29, 25} |
| | | {16, 24, 25, 29, 31, 29} |
| $d_2 > d_1 > d_3 > d_5 > d_4$ | {0, 8, 24, 28, 29, 31} | {8, 0, 8, 24, 28, 29} |
| | | {24, 8, 24, 28, 29, 31} |
| | | {0, 8, 24, 28, 29, 28} |
| | | {8, 24, 28, 29, 31, 29} |
| $d_2 > d_3 > d_1 > d_4 > d_5$ | {0, 8, 12, 28, 30, 31} | {8, 0, 8, 12, 28, 30} |
| | | {12, 8, 12, 28, 30, 31} |
| | | {0, 8, 12, 28, 30, 28} |
| | | {8, 12, 28, 30, 31, 30} |
| $d_3 > d_2 > d_4 > d_1 > d_5$ | {0, 4, 12, 14, 30, 31} | {4, 0, 4, 12, 14, 30} |
| | | {12, 4, 12, 14, 30, 31} |
| | | {0, 4, 12, 14, 30, 14} |
| | | {4, 12, 14, 30, 31, 30} |
| $d_3 > d_4 > d_2 > d_5 > d_1$ | {0, 4, 6, 14, 15, 31} | {4, 0, 4, 6, 14, 15} |
| | | {6, 4, 6, 14, 15, 31} |
| | | {0, 4, 6, 14, 15, 14} |
| | | {4, 6, 14, 15, 31, 15} |
| $d_4 > d_3 > d_5 > d_2 > d_1$ | {0, 2, 6, 7, 15, 31} | {2, 0, 2, 6, 7, 15} |
| | | {6, 2, 6, 7, 15, 31} |
| | | {0, 2, 6, 7, 15, 7} |
| | | {2, 6, 7, 15, 31, 15} |
| $d_4 > d_5 > d_3 > d_1 > d_2$ | {0, 2, 3, 7, 23, 31} | {2, 0, 2, 3, 7, 23} |
| | | {3, 2, 3, 7, 23, 31} |
| | | {0, 2, 3, 7, 23, 7} |
| | | {2, 3, 7, 23, 31, 23} |

TABLE 1-continued

| arrangement | first switching sequence | second switching sequences |
|---|---|---|
| $d_5 > d_4 > d_1 > d_3 > d_2$ | {0, 1, 3, 19, 23, 31} | {1, 0, 1, 3, 19, 23} |
| | | {3, 1, 3, 19, 23, 31} |
| | | {0, 1, 3, 19, 23, 19} |
| | | {1, 3, 19, 23, 31, 23} |
| $d_5 > d_1 > d_4 > d_2 > d_3$ | {0, 1, 17, 19, 27, 31} | {1, 0, 1, 17, 19, 27} |
| | | {17, 1, 17, 19, 27, 31} |
| | | {0, 1, 17, 19, 27, 19} |
| | | {1, 17, 19, 27, 31, 27} |
| $d_1 > d_5 > d_2 > d_4 > d_3$ | {0, 16, 17, 25, 27, 31} | {16, 0, 16, 17, 25, 27} |
| | | {17, 16, 17, 25, 27, 31} |
| | | {0, 16, 17, 25, 27, 25} |
| | | {16, 17, 25, 27, 31, 27} |

A vector of [0 0 0 0 0]=0 or [1 1 1 1 1]=31 is a so-called zero vector which corresponds to that the output voltage signals ($V_a$-$V_e$) are the same in magnitude, and that a number (M) (five in this embodiment) of line-to-line voltages (including $V_{ab}=V_a$-$V_b$, $V_{bc}=V_b$-$V_c$, $V_{cd}=V_c$-$V_d$, $V_{de}=V_d$-$V_e$ and $V_{ea}=V_e$-$V_a$) are all zero. A vector other than [0 0 0 0 0]=0 and [1 1 1 1 1]=31 is a so-called active vector which corresponds to that at least one of the output voltage signals ($V_a$-$V_e$) is different from remaining ones of the output voltage signals ($V_a$-$V_e$) in magnitude, and at least one of the line-to-line voltages ($V_{ab}$, $V_{bc}$, $V_{cd}$, $V_{de}$, $V_{ea}$) is not zero. It is known from Table 1 above that, regardless of the arrangement of the duty cycle values ($d_1$-$d_5$), the first and last vectors ($\vec{V_1}$, $\vec{V_6}$) of the first switching sequence are zero vectors, and remaining vectors ($\vec{V_2}$-$\vec{V_5}$) of the same are active vectors.

In this embodiment, a PWM period of the PWM signals ($\gamma_1$-$\gamma_5$, $\overline{\gamma_1}$-$\overline{\gamma_5}$) has a duration of $T_{pwm}$ that corresponds to the carrier frequency of $f_c$ (i.e., $T_{pwm}=1/f_c$), and the durations of the vectors ($\vec{V_1}$-$\vec{V_6}$) of the first switching sequence within an early portion of the PWM period are respectively $T_1=\{[V_{nN}+\min(r)]/[1-\max(r)+\min(r)]\}\times(1-d_{1st})\times T_{pwm}=[(1-d_{1st})/2]\times T_{pwm}$, $T_2=[(d_{1st}-d_{2nd})/2]\times T_{pwm}$, $T_3=[(d_{2nd}-d_{3rd})/2]\times T_{pwm}$, $T_4=[(d_{3rd}-d_{4th})/2]\times T_{pwm}$, $T_5=[(d_{4th}-d_{5th})/2]\times T_{pwm}$ and $T_6=(d_{5th}/2)\times T_{pwm}$, where $d_{1st}$ to $d_{5th}$ respectively denote the first to fifth largest ones of the duty cycle values ($d_1$-$d_5$). For example, under the circumstance where $d_1>d_2>d_5>d_3>d_4$, $d_{1st}=d_1$, $d_{2nd}=d_2$, $d_{3rd}=d_5$, $d_{4th}=d_3$, $d_{5th}=d_4$, $T_1=[(1-d_1)/2]\times T_{pwm}$, $T_2=[(d_1-d_2)/2]\times T_{pwm}$, $T_3=[(d_2-d_5)/2]\times T_{pwm}$, $T_4=[(d_5-d_3)/2]\times T_{pwm}$, $T_5=[(d_3-d_4)/2]\times T_{pwm}$ and $T_6=(d_4/2)\times T_{pwm}$.

Referring to FIGS. 5 to 9 and Table 1 above, in this embodiment, one of the vectors ($\vec{V_1'}$-$\vec{V_6'}$) of each second switching sequence is identical to one of the zero vectors ($\vec{V_1}$, $\vec{V_6}$) of the first switching sequence, and the duration thereof equals a sum of the durations of the zero vectors ($\vec{V_1}$, $\vec{V_6}$) of the first switching sequence; another two non-adjacent ones of the vectors ($\vec{V_1'}$-$\vec{V_6'}$) of each second switching sequence are each identical to the same one of the active vectors ($\vec{V_2}$-$\vec{V_5}$) of the first switching sequence, and a sum of the durations thereof equals the duration of said the same one of the active vectors ($\vec{V_2}$-$\vec{V_5}$) of the first switching sequence; and remaining ones of the vectors ($\vec{V_1'}$-$\vec{V_6'}$) of each second switching sequence are respectively identical to remaining ones of the active vectors ($\vec{V_2}$-$\vec{V_5}$) of the first switching sequence, and the durations thereof respectively equal the durations of said remaining ones of the active vectors ($\vec{V_2}$-$\vec{V_5}$) of the first switching sequence.

Figure 6:
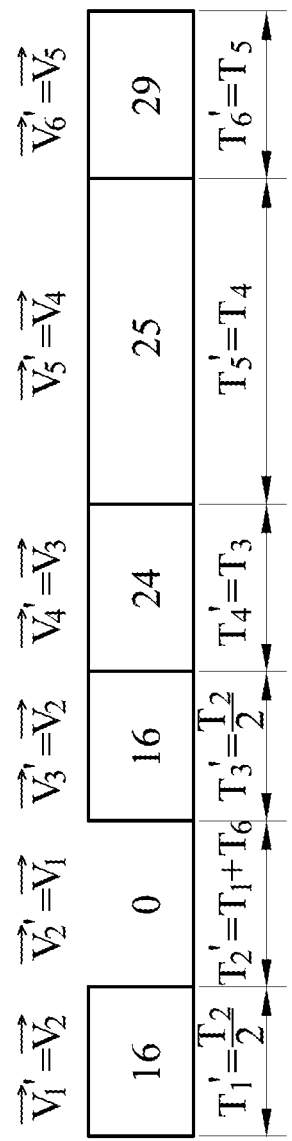
FIGS. 6 to 9 are plots respectively illustrating four exemplary second switching sequences of the embodiment.

In this embodiment, for a first one of the second switching sequences within the early portion of the PWM period as exemplified in FIG. 6, the vector ($\vec{V_2'}$) is identical to the first vector ($\vec{V_1}$) of the first switching sequence, and has the duration of $T_2'=T_1+T_6$; the non-adjacent vectors ($\vec{V_1'}$, $\vec{V_3'}$) are each identical to the second vector ($\vec{V_2}$) of the first switching sequence, and respectively have the durations of $T_1'=T_2/2$ and $T_3'=T_2/2$; and the remaining vectors ($\vec{V_4'}$-$\vec{V_6'}$) are respectively identical to the third to fifth vectors ($\vec{V_3}$-$\vec{V_5}$) of the first switching sequence, and respectively have the durations of $T_4'=T_3$, $T_5'=T_4$ and $T_6'=T_5$.

Figure 7:
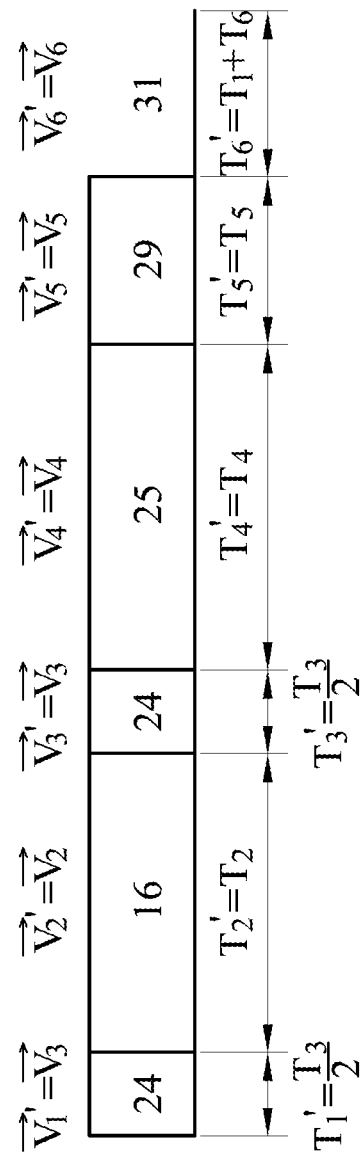

In this embodiment, for a second one of the second switching sequences within the early portion of the PWM period as exemplified in FIG. 7, the vector ($\vec{V_6'}$) is identical to the last vector ($\vec{V_6}$) of the first switching sequence, and has the duration of $T_6'=T_1+T_6$; the non-adjacent vectors ($\vec{V_1'}$, $\vec{V_3'}$) are each identical to the third vector ($\vec{V_3}$) of the first switching sequence, and respectively have the durations of $T_1'=T_3/2$ and $T_3'=T_3/2$; and the remaining vectors ($\vec{V_2'}$, $\vec{V_4'}$, $\vec{V_5'}$) are respectively identical to the second, fourth and fifth vectors ($\vec{V_2}$, $\vec{V_4}$, $\vec{V_5}$) of the first switching sequence, and respectively have the durations of $T_2'=T_2$, $T_4'=T_4$ and $T_5'=T_5$.

Figure 8:
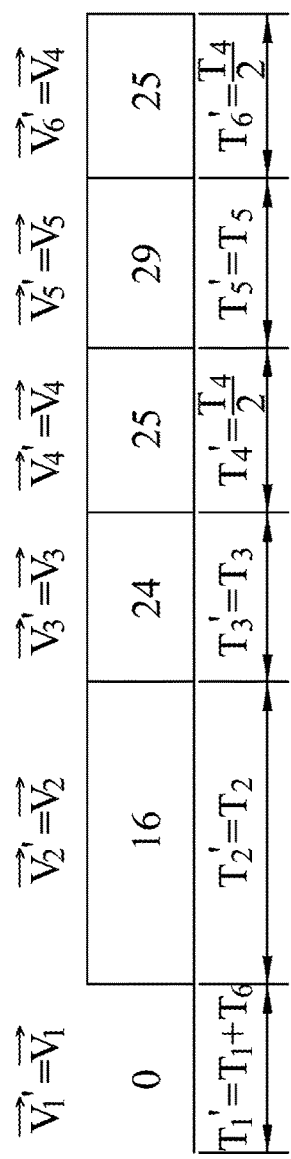

In this embodiment, for a third one of the second switching sequences within the early portion of the PWM period as exemplified in FIG. 8, the vector ($\vec{V_6'}$) is identical to the first vector ($\vec{V_1}$) of the first switching sequence, and has the duration of $T_1'=T_1+T_6$; the non-adjacent vectors ($\vec{V_4'}$, $\vec{V_6'}$) are each identical to the antepenultimate vector ($\vec{V_4}$) of the first switching sequence, and respectively have the durations of $T_4'=T_4/2$ and $T_6'=T_4/2$; and the remaining vectors ($\vec{V_2'}$, $\vec{V_3'}$, $\vec{V_5'}$) are respectively identical to the second, third and fifth vectors ($\vec{V_2}$, $\vec{V_3}$, $\vec{V_5}$) of the first switching sequence, and respectively have the durations of $T_2'=T_2$, $T_3'=T_3$ and $T_5'=T_5$.

Figure 9:
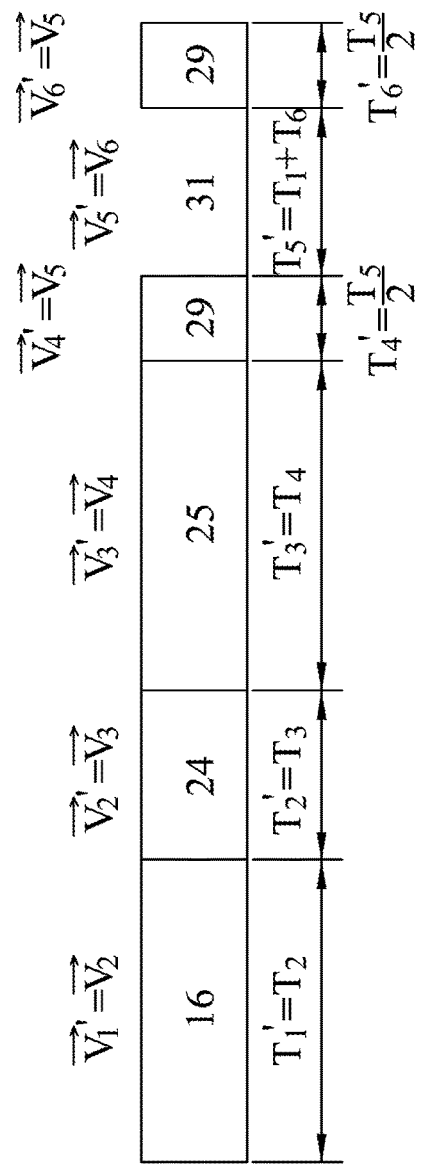

In this embodiment, for a fourth one of the second switching sequences within the early portion of the PWM period as exemplified in FIG. 9, the vector ($\vec{V_5'}$) is identical to the last vector ($\vec{V_6}$) of the first switching sequence, and has the duration of $T_5'=T_1+T_6$; the non-adjacent vectors ($\vec{V_4'}$, $\vec{V_6'}$) are each identical to the penultimate vector ($\vec{V_5}$) of the first switching sequence, and respectively have the durations of $T_4'=T_5/2$ and $T_6'=T_5/2$; and the remaining vectors ($\vec{V_1'}$-$\vec{V_3'}$) are respectively identical to the second to fourth vectors ($\vec{V_2}$-$\vec{V_4}$) of the first switching sequence, and respectively have the durations of $T_1'=T_2$, $T_2'=T_3$ and $T_3'=T_4$.

It should be noted that the durations of the two non-adjacent vectors of each second switching sequence that correspond to the same vector of the first switching sequence are the same in this embodiment, but may be different in other embodiments.

Referring to FIGS. 2 to 4, in this embodiment, the selecting module 25 includes an estimating unit 251 and a selecting unit 252.

The estimating unit 251 is coupled to the sequence generating module 24 for receiving the first and second switching sequences therefrom, and is coupled further to the reference generating module 21 for receiving the reference values ($r_1$-$r_5$) therefrom. The estimating unit 251 estimates, based on the first and second switching sequences and the reference values ($r_1$-$r_5$), a plurality of current harmonic distortion factors respectively for the first and second switching sequences. The current harmonic distortion factor ($I_{HDF1}$) corresponding to the first switching sequence may be estimated according to the following equation:

$$I_{HDF1} = \sum_{m=1}^{M+1} i_{err,m} = \sum_{m=1}^{M+1} \left( \frac{1}{L} \cdot \int_{T_m} \left\| C_M \cdot \vec{V}_m^T - C_M \cdot [r_1 \ r_2 \ r_3 \ \ldots \ r_M]^T \right\|_2^2 dt \right)$$

$$\left( I_{HDF1} = \sum_{m=1}^{6} i_{err,m} = \sum_{m=1}^{6} \left( \frac{1}{L} \cdot \int_{T_m} \left\| C_5 \cdot \vec{V}_m^T - C_5 \cdot [r_1 \ r_2 \ r_3 \ r_4 \ r_5]^T \right\|_2^2 dt \right) \right.$$

in this embodiment), and the current harmonic distortion factor ($I_{HDF2}$) corresponding to each second switching sequence may be estimated according to the following equation:

$$I_{HDF2} = \sum_{m=1}^{M+1} i_{err,m} = \sum_{m=1}^{M+1} \left( \frac{1}{L} \cdot \int_{T'_m} \left\| C_M \cdot \vec{V}_m^T - C_M \cdot [r_1 \ r_2 \ r_3 \ \ldots \ r_M]^T \right\|_2^2 dt \right)$$

$$\left( I_{HDF2} = \sum_{m=1}^{6} i_{err,m} = \sum_{m=1}^{6} \left( \frac{1}{L} \cdot \int_{T'_m} \left\| C_5 \cdot \vec{V}_m^T - C_5 \cdot [r_1 \ r_2 \ r_3 \ r_4 \ r_5]^T \right\|_2^2 dt \right) \right.$$

in this embodiment), in this embodiment), where L denotes an inductance of the five-phase load 100, $C_M$ is an $(M-1)$-by-$M$ matrix and equals $\frac{2}{M} \cdot \begin{bmatrix} \cos 0 & \cos\theta & \cos 2\theta & \ldots \\ \sin 0 & \sin\theta & \sin 2\theta & \ldots \\ \cos 0 & \cos 2\theta & \cos 4\theta & \ldots \\ \sin 0 & \sin 2\theta & \sin 4\theta & \ldots \\ \cos 0 & \cos 3\theta & \cos 6\theta & \ldots \\ \sin 0 & \sin 3\theta & \sin 6\theta & \ldots \\ \vdots & \vdots & \vdots & \ddots \end{bmatrix}$ $\left( C_5 = \frac{2}{5} \cdot \begin{bmatrix} \cos 0 & \cos\theta & \cos 2\theta & \cos 3\theta & \cos 4\theta \\ \sin 0 & \sin\theta & \sin 2\theta & \sin 3\theta & \sin 4\theta \\ \cos 0 & \cos 2\theta & \cos 4\theta & \cos 6\theta & \cos 8\theta \\ \sin 0 & \sin 2\theta & \sin 4\theta & \sin 6\theta & \sin 8\theta \end{bmatrix} \text{ in this embodiment} \right)$, in this embodiment), and $\theta=2\pi/M$ ($\theta=2\pi/5$ in this embodiment). For example, under the circumstance where $d_1 > d_2 > d_5 > d_3 > d_4$, the current harmonic distortion factor ($I_{HDF1}$) corresponding to the first switching sequence is estimated according to the following equation:

$$I_{HDF1} = \frac{1}{L} \cdot \int_{T_1} \| C_5 \cdot [0\ 0\ 0\ 0\ 0]^T - C_5 \cdot [r_1\ r_2\ r_3\ r_4\ r_5]^T \|_2^2 dt +$$

$$\frac{1}{L} \cdot \int_{T_2} \| C_5 \cdot [1\ 0\ 0\ 0\ 0]^T - C_5 \cdot [r_1\ r_2\ r_3\ r_4\ r_5]^T \|_2^2 dt +$$

$$\frac{1}{L} \cdot \int_{T_3} \| C_5 \cdot [1\ 1\ 0\ 0\ 0]^T - C_5 \cdot [r_1\ r_2\ r_3\ r_4\ r_5]^T \|_2^2 dt +$$

$$\frac{1}{L} \cdot \int_{T_4} \| C_5 \cdot [1\ 1\ 0\ 0\ 1]^T - C_5 \cdot [r_1\ r_2\ r_3\ r_4\ r_5]^T \|_2^2 dt +$$

$$\frac{1}{L} \cdot \int_{T_5} \| C_5 \cdot [1\ 1\ 1\ 0\ 1]^T - C_5 \cdot [r_1\ r_2\ r_3\ r_4\ r_5]^T \|_2^2 dt +$$

$$\frac{1}{L} \cdot \int_{T_6} \| C_5 \cdot [1\ 1\ 1\ 1\ 1]^T - C_5 \cdot [r_1\ r_2\ r_3\ r_4\ r_5]^T \|_2^2 dt,$$

the current harmonic distortion factor ($I_{HDF2}$) corresponding to the first one of the second switching sequences is estimated according to the following equation:

$$I_{HDF2} = \frac{1}{L} \cdot \int_{T'_1} \| C_5 \cdot [1\ 0\ 0\ 0\ 0]^T - C_5 \cdot [r_1\ r_2\ r_3\ r_4\ r_5]^T \|_2^2 dt +$$

$$\frac{1}{L} \cdot \int_{T'_2} \| C_5 \cdot [0\ 0\ 0\ 0\ 0]^T - C_5 \cdot [r_1\ r_2\ r_3\ r_4\ r_5]^T \|_2^2 dt +$$

$$\frac{1}{L} \cdot \int_{T'_3} \| C_5 \cdot [1\ 0\ 0\ 0\ 0]^T - C_5 \cdot [r_1\ r_2\ r_3\ r_4\ r_5]^T \|_2^2 dt +$$

$$\frac{1}{L} \cdot \int_{T'_4} \| C_5 \cdot [1\ 1\ 0\ 0\ 0]^T - C_5 \cdot [r_1\ r_2\ r_3\ r_4\ r_5]^T \|_2^2 dt +$$

$$\frac{1}{L} \cdot \int_{T'_5} \| C_5 \cdot [1\ 1\ 0\ 0\ 1]^T - C_5 \cdot [r_1\ r_2\ r_3\ r_4\ r_5]^T \|_2^2 dt +$$

$$\frac{1}{L} \cdot \int_{T'_6} \| C_5 \cdot [1\ 1\ 1\ 0\ 1]^T - C_5 \cdot [r_1\ r_2\ r_3\ r_4\ r_5]^T \|_2^2 dt,$$

and so on.

The selecting unit 252 is coupled to the sequence generating module 24 for receiving the first and second switching sequences therefrom, is coupled further to the estimating unit 251 for receiving the current harmonic distortion factors therefrom, and is coupled further to the output generating module 26. The selecting unit 252 compares the current harmonic distortion factors, and selects one of the first and second switching sequences that corresponds to a minimum one of the current harmonic distortion factors to serve as the selected switching sequence for the output generating module 26.

Figure 10:
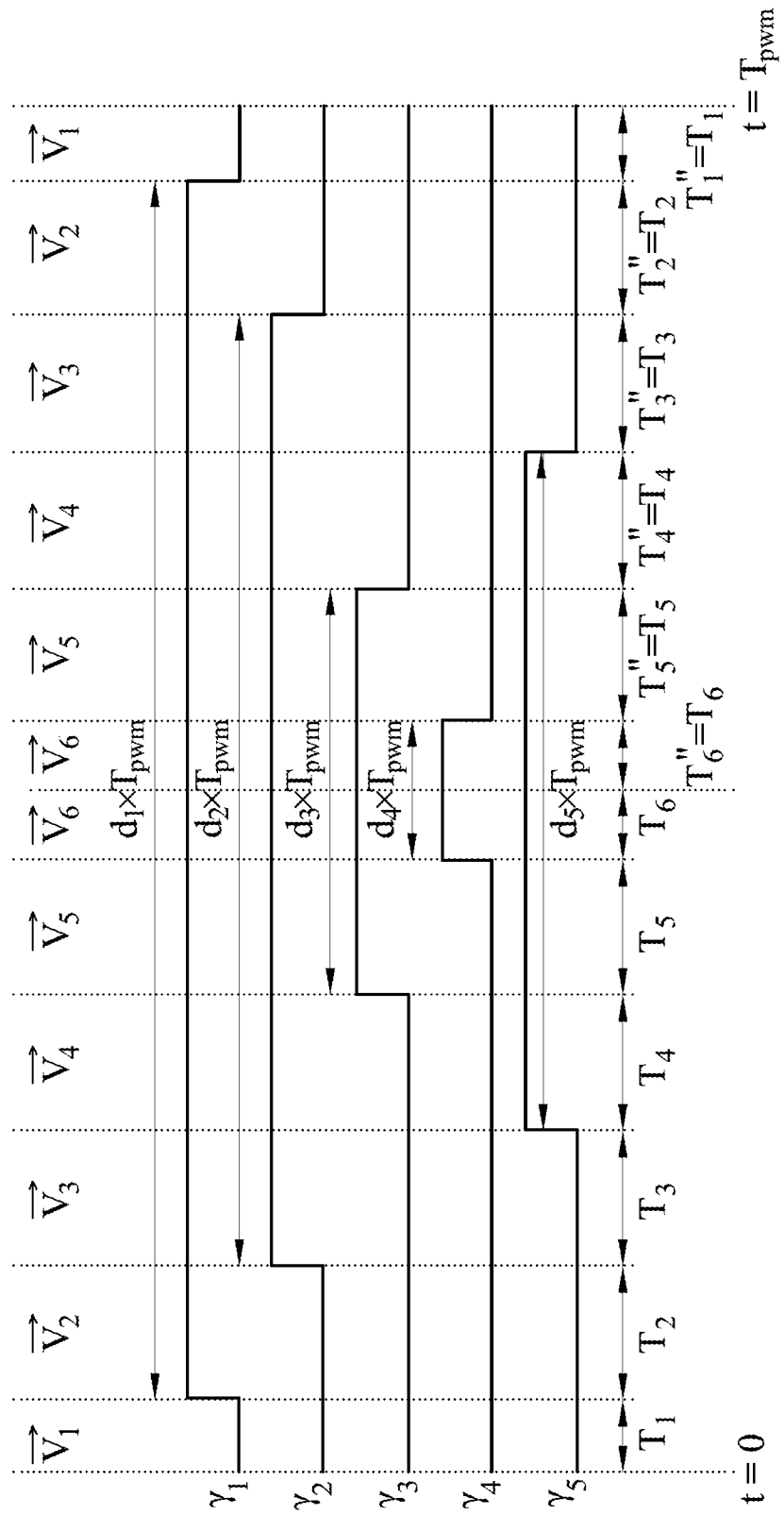
FIG. 10 is a timing diagram illustrating five pulse width modulation (PWM) signals of the embodiment that are generated when the exemplary first switching sequence shown in FIG. 5 is selected.
Figure 11:
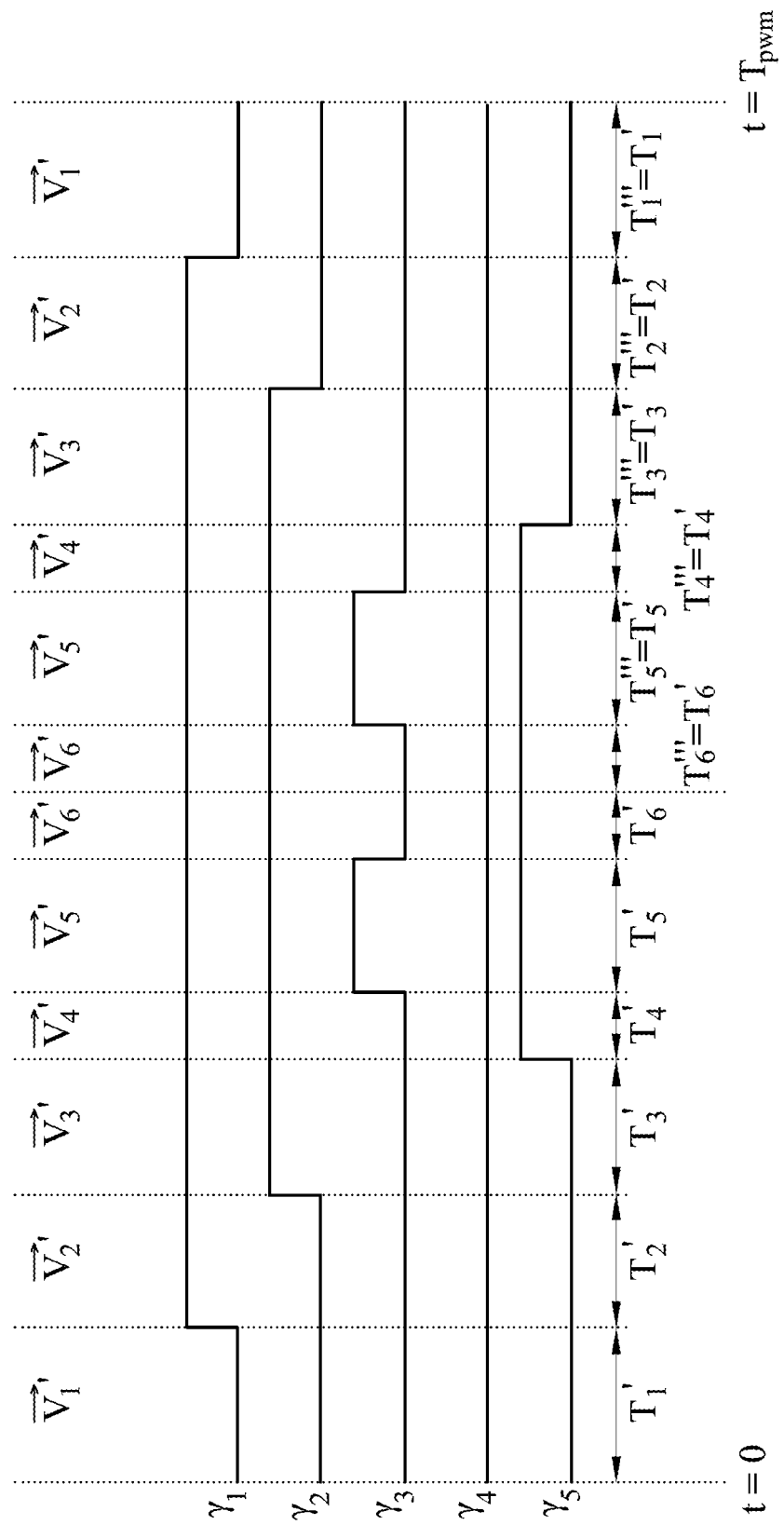
FIG. 11 is a timing diagram illustrating the five PWM signals that are generated when the exemplary second switching sequence shown in FIG. 8 is selected.
Figure 12:
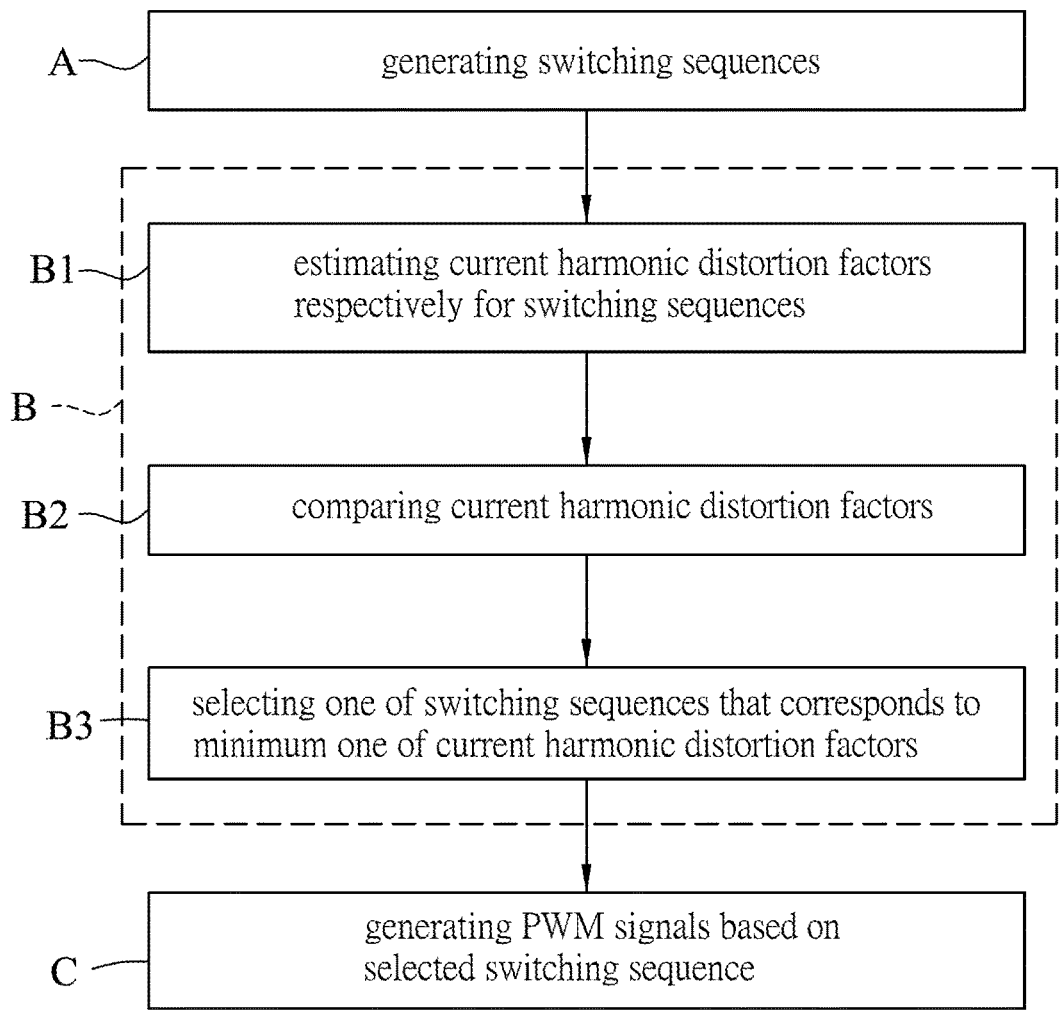
FIG. 12 is a flow chart illustrating a control method performed by the controller.

Referring to FIGS. 10 and 11, in this embodiment, during the PWM period that has the duration of $T_{pwm}$, the PWM signals ($\gamma_1$-$\gamma_5$) change over time, and sequentially correspond to the first vector ($\vec{V}_1$ or $\vec{V}_1'$) of the selected switching sequence for the duration of $T_1$ or $T_1'$, the second vector ($\vec{V}_2$ or $\vec{V}_2'$) of the selected switching sequence for the duration $T_2$ or $T_2'$, ... so on and so forth to the last vector ($\vec{V}_6$ or $\vec{V}_6'$) of the selected switching sequence for the duration of $T_6$ or $T_6'$, the last vector ($\vec{V_6}$ or $\vec{V_6}'$) of the selected switching sequence for a duration of $T_6''$ or $T_6'''$, the penultimate vector ($\vec{V_5}$ or $\vec{V_5}'$) of the selected switching sequence for a duration of $T_5''$ or $T_5'''$, . . . so on and so forth to the first vector ($\vec{V_1}$ or $\vec{V_1}'$) of the selected switching sequence for a duration of $T_1''$ or $T_1'''$, and so do the PWM signals ($\overline{\gamma_1}$-$\overline{\gamma_5}$). When the first switching sequence is selected, the second correspondence of the PWM signals ($\gamma_1$-$\gamma_5$) to the first vector ($\vec{V_1}$) lasts for the duration of $T_1''=(1-d_{1st})\times T_{pwm}-T_1'=T_1$, the second correspondence of the PWM signals ($\gamma_1$-$\gamma_5$) to the second vector ($\vec{V_2}$) lasts for the duration of $T_2''=T_2$, the second correspondence of the PWM signals ($\gamma_1$-$\gamma_5$) to the third vector ($\vec{V_3}$) lasts for the duration of $T_3''=T_3$, the second correspondence of the PWM signals ($\gamma_1$-$\gamma_5$) to the fourth vector ($\vec{V_4}$) lasts for the duration of $T_4''=T_4$, the second correspondence of the PWM signals ($\gamma_1$-$\gamma_5$) to the pentuliamte vector ($\vec{V_5}$) lasts for the duration of $T_5''=T_5$, and the second correspondence of the PWM signals ($\gamma_1$-$\gamma_5$) to the last vector ($\vec{V_6}$) lasts for the duration of $T_6''=T_6$. When the selected switching sequence is any one of the second switching sequences, the second correspondence of the PWM signals ($\gamma_1$-$\gamma_5$) to the vectors ($\vec{V_1'}$-$\vec{V_6'}$) last the durations of $T_1'''$ to $T_6'''$, respectively, with the durations of $T_1'''$ to $T_6'''$ defined as follows. When the first one of the second switching sequences is selected, $T_1'''=T_1'$, $T_2'''=(1-d_{1st}+d_{5th})\times T_{pwm}-T_2'=T_2'$, $T_3'''=T_3'$, $T_4'''=T_4'$, $T_5'''=T_5'$ and $T_6'''=T_6'$. When the second one of the second switching sequences is selected, $T_1'''=T_1'$, $T_2'''=T_2'$, $T_3'''=T_3'$, $T_4'''=T_4'$, $T_5'''=T_5'$ and $T_6'''=(1-d_{1st}+d_{5th})\times T_{pwm}-T_6'=T_6'$. When the third one of the second switching sequences is selected, $T_1'''=(1-d_{1st}+d_{5th})\times T_{pwm}-T_1'=T_1'$, $T_2'''=T_2'$, $T_3'''=T_3'$, $T_4'''=T_4'$, $T_5'''=T_5'$ and $T_6'''=T_6'$. When the fourth one of the second switching sequences is selected, $T_1'''=T_1'$, $T_2'''=T_2'$, $T_3'''=T_3'$, $T_4'''=T_4'$, $T_5'''=(1-d_{1st}+d_{5th})\times T_{pwm}-T_5'=T_5'''$ and $T_6'''=T_6'$. For example, under the circumstance where $d_1>d_2>d_5>d_3>d_4$, the PWM signals ($\gamma_1$-$\gamma_5$) that are generated when the first switching sequence shown in FIG. 5 is selected are depicted in FIG. 10, and the PWM signals ($\gamma_1$-$\gamma_5$) that are generated when the third one of the second switching sequences shown in FIG. 8 is selected are depicted in FIG. 11.

It should be noted that: (a) as exemplified in FIG. 10, the first switching sequence corresponds to that each PWM signal ($\gamma_1$-$\gamma_5$, $\overline{\gamma_1}$-$\overline{\gamma_5}$) transitions two times during the PWM period; (b) as exemplified in FIG. 11, each second switching sequence corresponds to that each of at least two complementary ones of the PWM signals ($\gamma_1$-$\gamma_5$, $\overline{\gamma_1}$-$\overline{\gamma_5}$) does not transition during the PWM period, and that each of remaining ones of the PWM signals ($\gamma_1$-$\gamma_5$, $\overline{\gamma_1}$-$\overline{\gamma_5}$) transitions at least two times during the PWM period; and (c) a total number of the transitions during the PWM period when any one of the at least one second switching sequence is selected equals a total number of the transitions during the PWM period when the first switching sequence is selected (i.e., 4×M (twenty in this embodiment)).

In this embodiment, as exemplified in FIG. 11, each second switching sequence corresponds to that each of two complementary ones of the PWM signals ($\gamma_1$-$\gamma_5$, $\overline{\gamma_1}$-$\overline{\gamma_5}$) does not transition during the PWM period, that each of another two complementary ones of the PWM signals ($\gamma_1$-$\gamma_5$, $\overline{\gamma_1}$-$\overline{\gamma_5}$) transitions four times during the PWM period, and that each of the other ones of the PWM signals ($\gamma_1$-$\gamma_5$, $\overline{\gamma_1}$-$\overline{\gamma_5}$) transitions two times during the PWM period.

As a result, the phase currents ($i_{aN}$-$i_{eN}$) are AC phase currents that have substantially the same fundamental frequency of $f_0$ and substantially the same peak amplitude, and an $m^{th}$ one thereof lags a first one thereof by substantially $[72\times(m-1)]°$ in phase, where $2 \le m \le 5$.

Referring to FIGS. 2 to 4 and 12, a control method performed by the controller 2 includes the following steps (A-C).

In step (A), the sequence generating module 24 generates the first and second switching sequences based on the duty cycle values ($d_1$-$d_5$).

In step (B), based on the first and second switching sequences and the reference values ($r_1$-$r_5$), the selecting module 25 selects, to serve as the selected switching sequence, one of the first and second switching sequences that is determined to make the phase currents ($i_{aN}$-$i_{eN}$) have the lowest total harmonic distortion.

In this embodiment, step (B) includes the following sub-steps (B1-B3).

In sub-step (B1), the estimating unit 251 estimates, based on the first and second switching sequences and the reference values ($r_1$-$r_5$), the current harmonic distortion factors respectively for the first and second switching sequences.

In sub-step (B2), the selecting unit 252 compares the current harmonic distortion factors.

In sub-step (B3), the selecting unit 252 selects one of the first and second switching sequences that corresponds to the minimum one of the current harmonic distortion factors to serve as the selected switching sequence.

In step (C), the output generating module 26 generates the PWM signals ($\gamma_1$-$\gamma_5$, $\overline{\gamma_1}$-$\overline{\gamma_5}$) based on the selected switching sequence.

Figure 13:
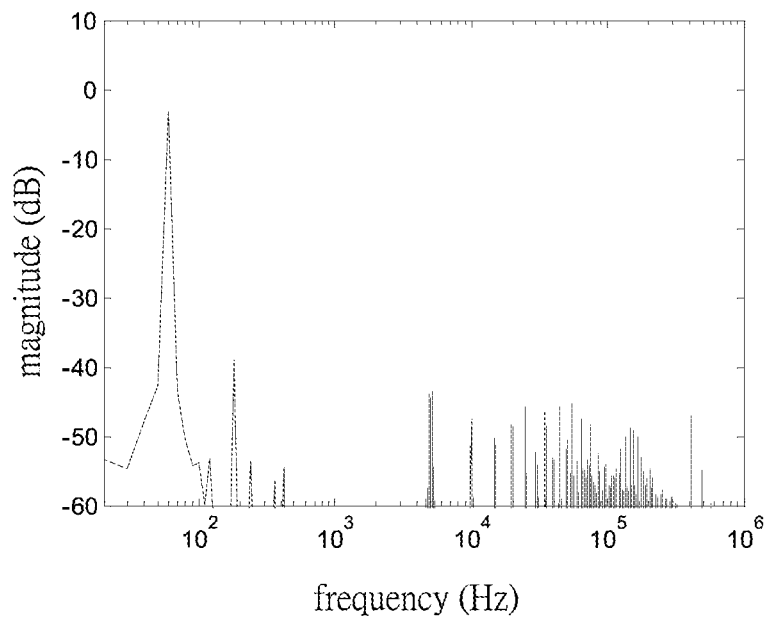
FIG. 13 is a plot illustrating a spectrum of a phase current that flows through the five-phase load under a predetermined circumstance where the PWM signals are always generated based on the first switching sequence.
Figure 14:
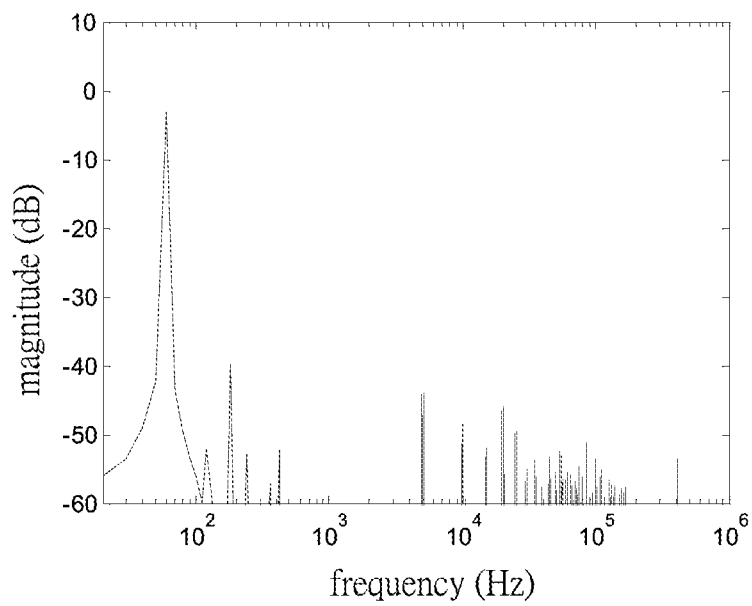
FIG. 14 is a plot illustrating a spectrum of the phase current in the embodiment.

3With the predetermined reference phase voltage curves having the same peak amplitude of $0.5\times V_{dc}$ and the same fundamental frequency of $f_0$=60 Hz, a spectrum of one of the phase currents ($i_{aN}$-$i_{eN}$) under a predetermined circumstance where the first switching sequence is always selected is depicted in FIG. 13, and the spectrum of said one of the phase currents ($i_{aN}$-$i_{eN}$) in this embodiment is depicted in FIG. 14. It is known from FIGS. 13 and 14 that harmonics of said one of the phase currents ($i_{aN}$-$i_{eN}$) around $10^4$ Hz to $10^5$ Hz are lower in this embodiment than those under the predetermined circumstance.

Figure 15:
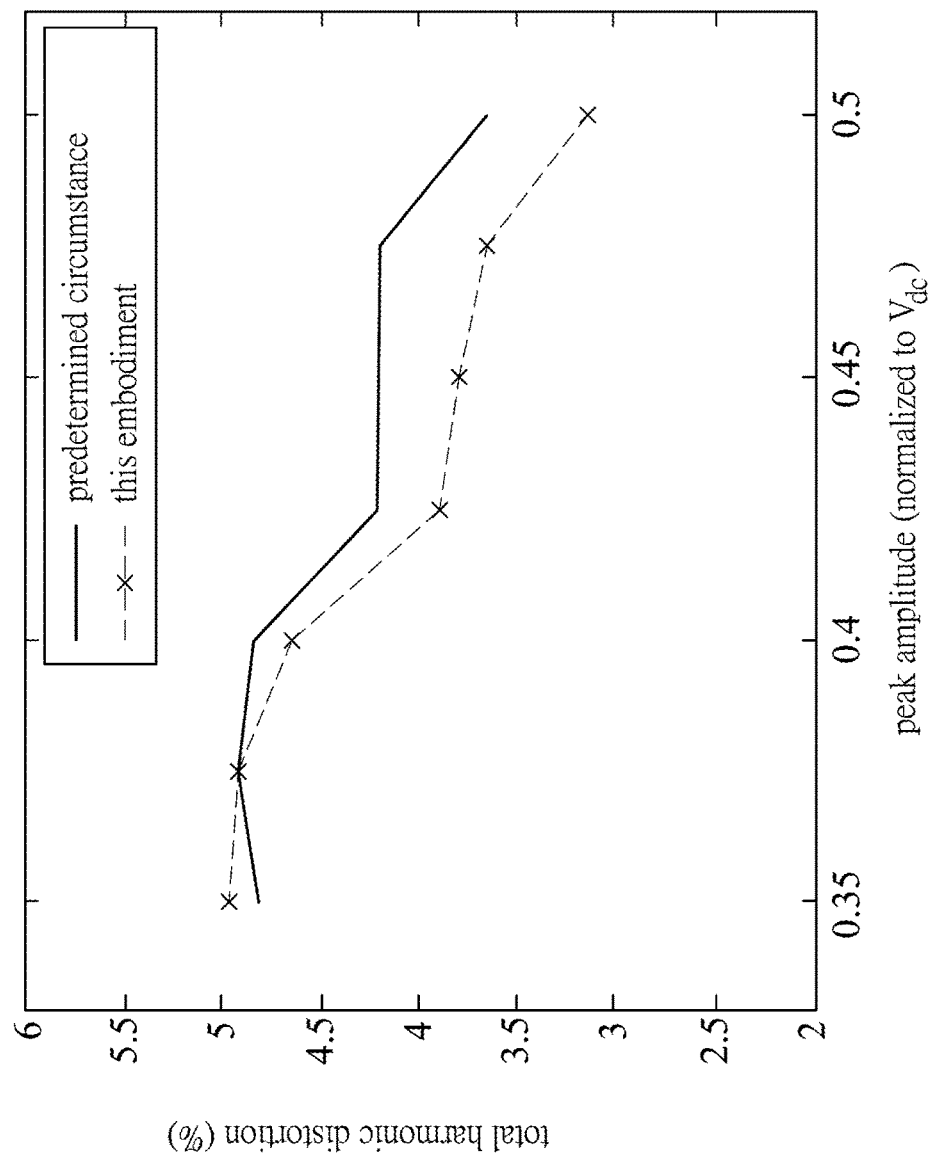
FIG. 15 is a plot illustrating total harmonic distortion versus amplitude characteristic under the predetermined circumstance and in the embodiment.

FIG. 15 illustrates the relationship between the total harmonic distortion of the phase currents ($i_{aN}$-$i_{eN}$) and the peak amplitude of the predetermined reference phase voltage curves (normalized to the input voltage ($V_{dc}$)) under the predetermined circumstance and that in this embodiment. It is known from FIG. 15 that, when the peak amplitude of the predetermined reference phase voltage curves is $0.5\times V_{dc}$, the total harmonic distortion of the phase currents ($i_{aN}$-$i_{eN}$) in this embodiment is reduced by 22% as compared to that under the predetermined circumstance.

In view of the above, since the controller 2 generates a plurality of switching sequences that correspond to the same total number of the transitions of the PWM signals ($\gamma_1$-$\gamma_5$, $\overline{\gamma_1}$-$\overline{\gamma_5}$) during the PWM period, and since the controller 2 generates the PWM signals ($\gamma_1$-$\gamma_5$, $\overline{\gamma_1}$-$\overline{\gamma_5}$) based on one of the switching sequences that is determined to make the phase currents ($i_{aN}$-$i_{eN}$) have the lowest total harmonic distortion, the total harmonic distortion of the phase currents ($i_{aN}$-$i_{eN}$) may be reduced without increasing the carrier frequency.

It should be noted that, in other embodiments, M may be an integer that is greater than two and that is other than five. In an example where M=3, the first switching sequence may be $\{\vec{V}_1, \vec{V}_2, \vec{V}_3, \vec{V}_4\}$, and the second switching sequences may respectively be $\{\vec{V}_2, \vec{V}_1, \vec{V}_2, \vec{V}_3\}$, $\{\vec{V}_3, \vec{V}_2, \vec{V}_3, \vec{V}_4\}$, $\{\vec{V}_1, \vec{V}_2, \vec{V}_3, \vec{V}_2\}$ and $\{\vec{V}_2, \vec{V}_3, \vec{V}_4, \vec{V}_3\}$. In another example where M=7, the first switching sequence may be $\{\vec{V}_1, \vec{V}_2, \vec{V}_3, \vec{V}_4, \vec{V}_5, \vec{V}_6, \vec{V}_7, \vec{V}_8\}$, and the second switching sequences may respectively be $\{\vec{V}_2, \vec{V}_1, \vec{V}_2, \vec{V}_3, \vec{V}_4, \vec{V}_5, \vec{V}_6, \vec{V}_7\}$, $\{\vec{V}_3, \vec{V}_2, \vec{V}_3, \vec{V}_4, \vec{V}_5, \vec{V}_6, \vec{V}_7, \vec{V}_8\}$, $\{\vec{V}_1, \vec{V}_2, \vec{V}_3, \vec{V}_4, \vec{V}_5, \vec{V}_6, \vec{V}_7, \vec{V}_6\}$ and $\{\vec{V}_2, \vec{V}_3, \vec{V}_4, \vec{V}_5, \vec{V}_6, \vec{V}_7, \vec{V}_8, \vec{V}_7\}$.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A driving apparatus used to drive a multi-phase load, said driving apparatus comprising:
    an inverter used to receive an input voltage, and receiving a plurality of pulse width modulation (PWM) signals, said inverter converting, based on the PWM signals, the input voltage into a plurality of output voltage signals that are used to drive the multi-phase load; and
    a controller including
        a sequence generating module receiving a plurality of duty cycle values, and generating a first switching sequence and at least one second switching sequence based on the duty cycle values,
        a selecting module coupled to said sequence generating module for receiving the first and second switching sequences therefrom, said selecting module selecting, to serve as a selected switching sequence, one of the first and second switching sequences that is determined to make a plurality of phase currents which flow through the multi-phase load due to the output voltage signals have lowest total harmonic distortion, and
        an output generating module coupled to said selecting module for receiving the selected switching sequence therefrom, and coupled further to said inverter, said output generating module generating the PWM signals for said inverter based on the selected switching sequence, each of the PWM signals being transitionable between a first state and a second state;
    wherein the first switching sequence corresponds to that each of the PWM signals transitions two times during a PWM period of the PWM signals;
    wherein each of the at least one second switching sequence corresponds to that each of at least two of the PWM signals does not transition during the PWM period, and that each of remaining ones of the PWM signals transitions at least two times during the PWM period; and
    wherein a total number of the transitions occurring in the PWM signals during the PWM period when any one of the at least one second switching sequence is selected equals a total number of the transitions occurring in the PWM signals during the PWM period when the first switching sequence is selected.

2. The driving apparatus of claim 1, wherein each of the at least one second switching sequence corresponds to that each of two of the PWM signals does not transition during the PWM period, that each of another two of the PWM signals transitions four times during the PWM period, and that each of the other ones of the PWM signals transitions two times during the PWM period.

3. The driving apparatus of claim 1, wherein:
    the first switching sequence includes a plurality of vectors which are arranged sequentially, a first one and a last one of which are zero vectors, and remaining ones of which are active vectors; and
    each of the at least one second switching sequence includes a plurality of vectors which are sequentially arranged, one of which is identical to one of the zero vectors of the first switching sequence, another two non-adjacent ones of which are each identical to a same one of the active vectors of the first switching sequence, and remaining ones of which are respectively identical to remaining ones of the active vectors of the first switching sequence.

4. The driving apparatus of claim 3, wherein:
    each of the vectors of the first and second switching sequences has a respective duration; and
    for each of the at least one second switching sequence, the duration of said one of the vectors thereof equals a sum of the durations of the zero vectors of the first switching sequence, a sum of the durations of said another two non-adjacent ones of the vectors thereof equals the duration of said the same one of the active vectors of the first switching sequence, and the durations of said remaining ones of the vectors thereof respectively equal the durations of the remaining ones of the active vectors of the first switching sequence.

5. The driving apparatus of claim 3, wherein for one of the at least one second switching sequence, said one of the vectors thereof is a second one of the vectors thereof, and is identical to the first one of the vectors of the first switching sequence, and said another two non-adjacent ones of the vectors thereof are respectively a first one and a third one of the vectors thereof, and are each identical to a second one of the vectors of the first switching sequence.

6. The driving apparatus of claim 3, wherein for one of the at least one second switching sequence, said one of the vectors thereof is a last one of the vectors thereof, and is identical to the last one of the vectors of the first switching sequence, and said another two non-adjacent ones of the vectors thereof are respectively a first one and a third one of the vectors thereof, and are each identical to a third one of the vectors of the first switching sequence.

7. The driving apparatus of claim 3, wherein for one of the at least one second switching sequence, said one of the vectors thereof is a first one of the vectors thereof, and is identical to the first one of the vectors of the first switching sequence, and said another two non-adjacent ones of the vectors thereof are respectively an antepenultimate one and a last one of the vectors thereof, and are each identical to an antepenultimate one of the vectors of the first switching sequence.

8. The driving apparatus of claim 3, wherein for one of the at least one second switching sequence, said one of the vectors thereof is a penultimate one of the vectors thereof, and is identical to the last one of the vectors of the first switching sequence, and said another two non-adjacent ones of the vectors thereof are respectively an antepenultimate one and a last one of the vectors thereof, and are each identical to a penultimate one of the vectors of the first switching sequence.

9. The driving apparatus of claim 1, wherein said selecting module includes:
   an estimating unit coupled to said sequence generating module for receiving the first and second switching sequences therefrom, said estimating unit estimating a plurality of current harmonic distortion factors respectively for the first and second switching sequences; and
   a selecting unit coupled to said sequence generating module for receiving the first and second switching sequences therefrom, coupled further to said estimating unit for receiving the current harmonic distortion factors therefrom, and coupled further to said output generating module, said selecting unit comparing the current harmonic distortion factors, and selecting one of the first and second switching sequences that corresponds to a minimum one of the current harmonic distortion factors to serve as the selected switching sequence for said output generating module.

10. A controller used to control an inverter to convert an input voltage into a plurality of output voltage signals for driving a multi-phase load, said controller comprising:
   a sequence generating module receiving a plurality of duty cycle values, and generating a first switching sequence and at least one second switching sequence based on the duty cycle values;
   a selecting module coupled to said sequence generating module for receiving the first and second switching sequences therefrom, said selecting module selecting, to serve as a selected switching sequence, one of the first and second switching sequences that is determined to make a plurality of phase currents which flow through the multi-phase load due to the output voltage signals have lowest total harmonic distortion; and
   an output generating module coupled to said selecting module for receiving the selected switching sequence therefrom, said output generating module generating, based on the selected switching sequence, a plurality of pulse width modulation (PWM) signals which are used to control the inverter, and each of which is transitionable between a first state and a second state;
   wherein the first switching sequence corresponds to that each of the PWM signals transitions two times during a PWM period of the PWM signals;
   wherein each of the at least one second switching sequence corresponds to that each of at least two of the PWM signals does not transition during the PWM period, and that each of remaining ones of the PWM signals transitions at least two times during the PWM period; and
   wherein a total number of the transitions occurring in the PWM signals during the PWM period when any one of the at least one second switching sequence is selected equals a total number of the transitions occurring in the PWM signals during the PWM period when the first switching sequence is selected.

11. The controller of claim 10, wherein each of the at least one second switching sequence corresponds to that each of two of the PWM signals does not transition during the PWM period, that each of another two of the PWM signals transitions four times during the PWM period, and that each of the other ones of the PWM signals transitions two times during the PWM period.

12. The controller of claim 10, wherein:
   the first switching sequence includes a plurality of vectors which are arranged sequentially, a first one and a last one of which are zero vectors, and remaining ones of which are active vectors; and
   each of the at least one second switching sequence includes a plurality of vectors which are sequentially arranged, one of which is identical to one of the zero vectors of the first switching sequence, another two non-adjacent ones of which are each identical to a same one of the active vectors of the first switching sequence, and remaining ones of which are respectively identical to remaining ones of the active vectors of the first switching sequence.

13. The controller of claim 12, wherein:
   each of the vectors of the first and second switching sequences has a respective duration; and
   for each of the at least one second switching sequence, the duration of said one of the vectors thereof equals a sum of the durations of the zero vectors of the first switching sequence, a sum of the durations of said another two non-adjacent ones of the vectors thereof equals the duration of said the same one of the active vectors of the first switching sequence, and the durations of said remaining ones of the vectors thereof respectively equal the durations of the remaining ones of the active vectors of the first switching sequence.

14. The controller of claim 10, wherein said selecting module includes:
   an estimating unit coupled to said sequence generating module for receiving the first and second switching sequences therefrom, said estimating unit estimating a plurality of current harmonic distortion factors respectively for the first and second switching sequences; and
   a selecting unit coupled to said sequence generating module for receiving the first and second switching sequences therefrom, coupled further to said estimating unit for receiving the current harmonic distortion factors therefrom, and coupled further to said output generating module, said selecting unit comparing the current harmonic distortion factors, and selecting one of the first and second switching sequences that corresponds to a minimum one of the current harmonic distortion factors to serve as the selected switching sequence for said output generating module.

15. A control method for controlling, using a controller, an inverter to convert an input voltage into a plurality of output voltage signals for driving a multi-phase load, said control method comprising steps of:
   generating, by the controller, a first switching sequence and at least one second switching sequence based on a plurality of duty cycle values;
   selecting to serve as a selected switching sequence, by the controller, one of the first and second switching sequences that is determined to make a plurality of phase currents which flow through the multi-phase load due to the output voltage signals have lowest total harmonic distortion; and generating based on the selected switching sequence, by the controller, a plurality of pulse width modulation (PWM) signals which are used to control the inverter, and each of which is transitionable between a first state and a second state;

wherein the first switching sequence corresponds to that each of the PWM signals transitions two times during a PWM period of the PWM signals;

wherein each of the at least one second switching sequence corresponds to that each of at least two of the PWM signals does not transition during the PWM period, and that each of remaining ones of the PWM signals transitions at least two times during the PWM period; and wherein a total number of the transitions occurring in the PWM signals during the PWM period when any one of the at least one second switching sequence is selected equals a total number of the transitions occurring in the PWM signals during the PWM period when the first switching sequence is selected.

16. The control method of claim 15, wherein each of the at least one second switching sequence corresponds to that each of two of the PWM signals does not transition during the PWM period, that each of another two of the PWM signals transitions four times during the PWM period, and that each of the other ones of the PWM signals transitions two times during the PWM period.

17. The control method of claim 15, wherein:
the first switching sequence includes a plurality of vectors which are arranged sequentially, a first one and a last one of which are zero vectors, and remaining ones of which are active vectors; and each of the at least one second switching sequence includes a plurality of vectors which are sequentially arranged, one of which is identical to one of the zero vectors of the first switching sequence, another two non-adjacent ones of which are each identical to a same one of the active vectors of the first switching sequence, and remaining ones of which are respectively identical to remaining ones of the active vectors of the first switching sequence.

18. The control method of claim 17, wherein:
each of the vectors of the first and second switching sequences has a respective duration; and for each of the at least one second switching sequence, the duration of said one of the vectors thereof equals a sum of the durations of the zero vectors of the first switching sequence, a sum of the durations of said another two non-adjacent ones of the vectors thereof equals the duration of said the same one of the active vectors of the first switching sequence, and the durations of said remaining ones of the vectors thereof respectively equal the durations of the remaining ones of the active vectors of the first switching sequence.

19. The control method of claim 15, wherein the step of selecting includes sub-steps of:
estimating a plurality of current harmonic distortion factors respectively for the first and second switching sequences;

comparing the current harmonic distortion factors; and selecting one of the first and second switching sequences that corresponds to a minimum one of the current harmonic distortion factors to serve as the selected switching sequence.

\* \* \* \* \*